UNITED STATES PATENT OFFICE.

CHARLES GERHARD, OF NEW YORK, N. Y.

COMPOSITION FOR BENGAL LIGHTS.

SPECIFICATION forming part of Letters Patent No. 363,224, dated May 17, 1887.

Application filed September 28, 1886. Serial No. 214,784. (No specimens.)

*To all whom it may concern:*

Be it known that I, CHARLES GERHARD, a citizen of the United States, residing at New York, in the county and State of New York, have invented new and useful Improvements in Combustible Compositions, of which the following is a specification.

The object of my invention is to provide a combustible composition which is not liable to spontaneously ignite or explode.

My composition consists of the following ingredients, combined in the proportion stated: nitrate or chlorate of strontium, twenty-four pounds; shellac, seven pounds. These ingredients are heated together under constant agitation until the shellac melts and the ingredients have been thoroughly mixed. Said mixture is then allowed to cool, and is then pulverized by suitable means—such, for example, as rollers. Then take glue, one and one-half pound, and gum, (preferably tragacanth,) three-fourths pound, and boil said glue and gum together in a suitable quantity of water, about one and one-half gallon. Then add to the mixture of glue and gum the mixture of nitrate or chlorate of strontium and shellac. By this addition a paste is formed, to which paste are added four (4) pounds of chlorate of potash.

To conveniently bring this compound into the market, or to have it conveniently ready for use, said compound can be applied to paper.

This compound will be found very useful for Bengal lights, and said compound is safe, as it is not liable to explode or to ignite except by direct contact with a light. Said compound also is not liable to be affected by the influence of the atmosphere.

What I claim as new, and desire to secure by Letters Patent, is—

The herein-described combustible composition of matter, consisting of nitrate (or chlorate) of strontium, shellac, glue, gum, and chlorate of potash, substantially in the proportion specified.

In testimony whereof I have hereunto set my hand and seal in the presence of two subscribing witnesses.

CHARLES GERHARD. [L. S.]

Witnesses:
A. FABER DU FAUR, Jr.,
E. F. KASTENHUBER.